(12) United States Patent
Landry et al.

(10) Patent No.: US 7,013,224 B2
(45) Date of Patent: Mar. 14, 2006

(54) METHOD AND APPARATUS TO PERFORM CRACK ESTIMATIONS FOR NUCLEAR REACTOR

(75) Inventors: Edward David Landry, Waterford, NY (US); James Elmer Leonard, San Jose, CA (US); Randy Raymond Stark, Morgan Hill, CA (US); Ronald Martin Horn, Palo Alto, CA (US)

(73) Assignee: General Electric Company, Schenectady, NY (US)

( * ) Notice: Subject to any disclaimer, the term of this patent is extended or adjusted under 35 U.S.C. 154(b) by 561 days.

(21) Appl. No.: 10/194,290

(22) Filed: Jul. 15, 2002

(65) Prior Publication Data

US 2004/0008806 A1  Jan. 15, 2004

(51) Int. Cl.
*G06F 19/00* (2006.01)
(52) U.S. Cl. .......................................... 702/35; 702/33
(58) Field of Classification Search ............. 356/237.1, 356/237.2, 240.1, 600; 376/245, 249, 250, 376/259, 277; 700/95, 108, 110; 702/33, 702/35, 36, 127, 182, 183, 184, 185, 188, 702/189, FOR 134, FOR 137; 703/2, 6, 703/7
See application file for complete search history.

(56) References Cited

U.S. PATENT DOCUMENTS

| | | | | |
|---|---|---|---|---|
| 5,455,777 A | * | 10/1995 | Fujiyama et al. | 702/34 |
| 5,479,824 A | * | 1/1996 | Torres | 73/602 |
| 5,539,656 A | * | 7/1996 | Annigeri et al. | 702/35 |
| 5,579,354 A | * | 11/1996 | Sakai et al. | 376/245 |
| 5,623,109 A | * | 4/1997 | Uchida et al. | 73/865.9 |
| 5,673,297 A | * | 9/1997 | Andresen | 376/305 |
| 5,724,254 A | * | 3/1998 | Millett et al. | 702/179 |
| 5,736,645 A | * | 4/1998 | Chin-Chan et al. | 73/799 |
| 5,768,330 A | * | 6/1998 | Andresen et al. | 376/305 |
| 5,817,958 A | * | 10/1998 | Uchida et al. | 73/865.9 |
| 6,259,758 B1 | * | 7/2001 | Kim et al. | 376/305 |
| 6,327,510 B1 | * | 12/2001 | Yoshida et al. | 700/9 |
| 2002/0021778 A1 | | 2/2002 | Takamori et al. | |

FOREIGN PATENT DOCUMENTS

JP   11-023565   *  1/1999

* cited by examiner

*Primary Examiner*—John Barlow
*Assistant Examiner*—Douglas N Washburn
(74) *Attorney, Agent, or Firm*—Harness Dickey & Pierce, P.L.C.

(57) ABSTRACT

The method includes receiving parameters input by a user and calculating crack behavior estimations based on the received parameters by using a plurality of accessible crack behavior models. The crack behavior estimations calculated from each of the models are displayed to the user in order to illustrate how the different models compare in calculating a desired crack behavior profile. The displayed crack behavior estimations utilize a compilation of both historical crack growth rate data, as well as predicted crack growth rate data, and may be displayed as an estimated crack growth rate versus time, or as estimated crack growth over time. These parameters are displayed graphically for each crack behavior model in order to enable the user to make a comparison for each crack growth model.

26 Claims, 7 Drawing Sheets

Crack Growth Rate Estimator
  Crack Growth Rate versus Time

Select Plant: HATCH 2 ▼ — 410

Select Units: ○ mm  ⊙ inches

Start Date: 04/09/1993   MM/DD/YYYY — 420

End Date: 05/03/1993   MM/DD/YYYY

430

Submit — 440

Crack Growth Rate Estimator
  Crack Growth Rate versus Time
        and
  Crack Growth versus Time

Select Plant: DUANE ARNOLD ▼ — 610

Select Units: ○ mm ⊙ inches

Initial Crack Size: 0.01  (0.000 No Fractions) — 620

Allowable Crack Size: 0.08  (0.000 No Fractions) — 630

Date Crack Was Measured: 01/01/1993  MM/DD/YYYY — 640

End Date: 08/01/1993  MM/DD/YYYY — 650

Submit — 660

Is DUANE ARNOLD Operating Under Hydrogen Water Chemistry ?

⊙ Yes   ○ No

Submit

METHOD AND APPARATUS TO PERFORM CRACK ESTIMATIONS FOR NUCLEAR REACTOR

BACKGROUND OF THE INVENTION

1. Field of the Invention

This invention relates generally to nuclear power plants and more particularly, to a method and apparatus enabling a user to perform estimated crack behavior calculations for the user's nuclear reactor.

2. Related Art

Water chemistry characteristics in a nuclear reactor such as boiling water nuclear reactor may be used to predict crack growth behavior by using an existing, fundamental crack growth behavior model. The model was derived from detailed engineering analysis of historical data and historical behavior, so that crack growth behavior estimation can be performed accurately using water chemistry characteristics and materials characteristics. Current evaluations, however, require all crack growth assessments to be done by different individuals, typically by hand, upon user request. Moreover, a complete crack growth analysis done by specialists is both expensive and time consuming.

Recently, an automated method for crack behavior prediction has been developed. Referring to commonly assigned U.S. application Ser. No. 2001-0053965 to Horn et al., entitled "Method And Apparatus For Automated Crack Behavior Prediction Determination", there is an automated method for predicting component crack behavior in a nuclear reactor, in which water chemistry characteristics are input over a computer network, and a crack growth behavior model is accessed for predicting component crack behavior according to the input water chemistry characteristics. A crack growth prediction profile, or crack growth derived result according to the analysis is then output to a user, via the computer network.

In Horn et al., a user connects to a system server on the internet for example. The user inputs characteristics such a frequency, stress intensity, crack tip strain rate, water chemistry and environmental parameters such as conductivity, corrosion potential, oxygen level, etc. to the server. When all the inputs are complete, the server accesses a crack behavior model that predicts component crack behavior according to the characteristics input by the user. The server, via a suitable graphical user interface, outputs a crack growth prediction profile, which may represent a real time crack growth prediction. This is a "real time" evaluation in the sense that it uses current reactor plant data in the context of historical data to project future behavior, a process that can be updated at any time to include new plant data. The output is a graphical representation of a crack growth rate on a chart or graph, for example As noted above, a full crack growth analysis is both expensive and time consuming, and even with the above automated system, a user must input a substantial number of parameters in order to receive a crack growth prediction profile from a single crack behavior model. Further, monitoring personnel from nuclear reactors need a mechanism to perform a superficial scoping analysis of a particular crack very quickly, in order to determine whether or not a full analysis is required. Accordingly, potential users require a method by which they can quickly access and review all current cracks in their nuclear reactor over a relatively short period of time, at their convenience, and at minimal cost and time to the user.

SUMMARY OF THE INVENTION

In an exemplary embodiment, a method of performing crack behavior estimations includes receiving parameters input by a user and calculating crack behavior estimations based on the received parameters by using a plurality of accessible crack behavior models. The crack behavior estimations are displayed to the user in order to illustrate how the different models compare in calculating a desired crack behavior profile. The displayed crack behavior estimations utilize a compilation of both historical crack growth rate data, as well as predicted crack growth rate data, and may be displayed as an estimated crack growth rate versus time, or as estimated crack growth over time. These parameters are displayed graphically for each crack behavior model, such as on a plot, in order to enable the user to make a comparison of each crack growth model to determine whether or not the crack needs a full crack growth analysis.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

The present invention enables users to perform scoping studies on crack behavior such as crack growth rate and crack growth. Based on their input from their particular plant, users may access the system to view historical crack growth rates calculated from various models, as compared to a nuclear regulatory commission (NRC) accepted value for crack growth rate or crack growth. Crack growth rates and crack growth are calculated using several simplified crack behavior models, including an industry standard model, or BWRVIP crack behavior model; a GEP-lite crack behavior model and a GEP-lite with HWC (Hydrogen Water Chemistry). GEP-lite and GEP-lite with HWC are derivative models of a model described in U.S. application Ser. No. 2001-0053965 to Horn et al. The results of these models are to be primarily used for scoping purposes. A scoping analysis is an initial, superficial analysis to enable the user to quickly determine whether or not a full crack profile analysis will be necessary or required.

In an embodiment, the user accesses a central nexus, such as an application server running a website, via a suitable interface such as a web-based internet browser. The user inputs parameters of their nuclear reactor to the server, and receives, from or by way of a graphic user interface (GUI) at the server, a plurality of displayed crack behavior estimations that were calculated by the server from the input reactor plant parameters. The crack behavior estimations are calculated at the server. The server runs algorithms of the aforementioned crack behavior models, and displays calculated crack growth rate and crack growth results, along with NRC accepted values, for comparison by the user. The different results enable the user to efficiently determine whether or not a further complete crack profile analysis is needed.

In yet another embodiment, a computer program product includes computer program logic that instructs a processor to host calculations for crack behavior estimations at a central nexus. The computer program logic causes a processor in the computer product to accept reactor plant parameters at the nexus, and to process the parameters at the nexus by referring to a plurality of accessible crack behavior models, and by accessing a water chemistry database. The results, which may be crack behavior estimation such as a plot of crack growth rate and a plot of crack growth versus time, are output for review by a user.

In yet a further embodiment, an apparatus in accordance with the invention includes an application server in a worldwide web-based network for determining crack behavior estimations for a nuclear reactor of a requesting client. The application server includes means for receiving reactor parameters input by the requesting client, means for calculating crack behavior estimations based on the received parameters and means for displaying the calculated crack behavior estimations for review by the requesting client. The application server includes processing circuitry to handle a secure connection from a user over a suitable medium such as an encrypted 128-bit secure socket layer (SSL) connection, to handle all crack growth calculations, and to provide a suitable graphical output such as plots, which are communicated to the user via a suitable graphic user interface (GUI), to be received by the client's internet browser.

Accordingly, the method in apparatus enables users to perform crack behavior scoping calculations for a nuclear reactor at their convenience. The user can potentially review all current cracks in their reactor over a relatively short period of time. Using the results from the method and apparatus, the customer may determine which cracks require a full analysis thus, users may realize cost savings and a potential increase in the their productivity.

Figure 1:
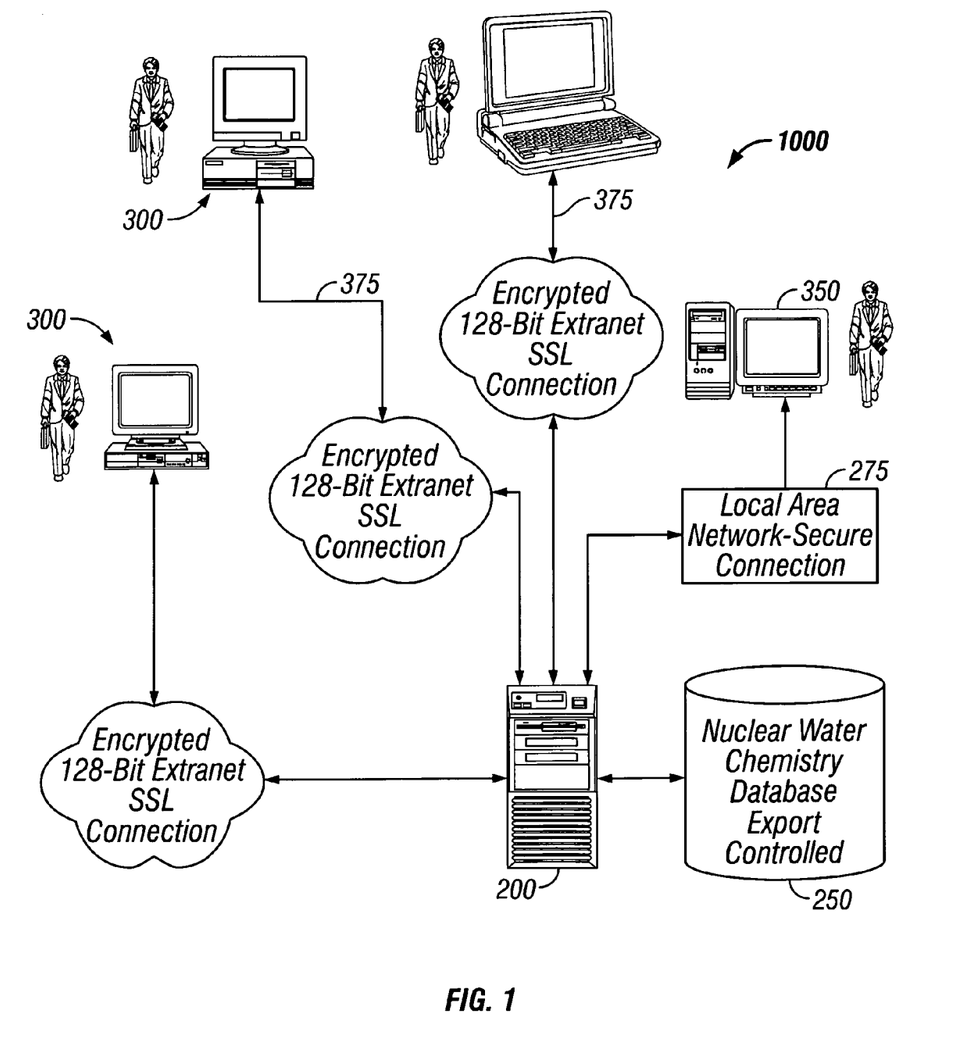
FIG. 1 illustrates a crack behavior estimation system in accordance with the invention.

FIG. 1 illustrates a crack behavior estimation system in accordance with the invention. Referring to FIG. 1, system 1000 includes an application server 200, which serves as a central nexus of an accessible website, for example. Application server 200 may be operatively connected to a nuclear water chemistry database 250. As will be discussed in further detail below, application server 200 accesses all data relevant to performing growth estimation calculations from the nuclear water chemistry database 250. A plurality of external users 300 communicate with application server 200 over a suitable encrypted medium such as an encrypted 128-bit SSL connection 375, although the present invention is not limited to this encrypted communication medium. Preferably, the user connects to the application server from a personal computer, laptop, personal digital assistant (PDA), etc. using a suitable interface such as a web-based internet browser. Further, application server 200 is accessible to internal users 300 via a suitable local area network (LAN 275). The application server 200 is responsible for online security, crack growth calculations, and the creation of suitable screens that provide a graphical representation of crack behavior. The graphical information is communicated over the 128-bit SSL connection 375 to be displayed on a suitable display device of the user 300 or 350. Hereinafter, the term user refers to both an internal user 300 and an external user 350 of system 1000.

Figure 2:
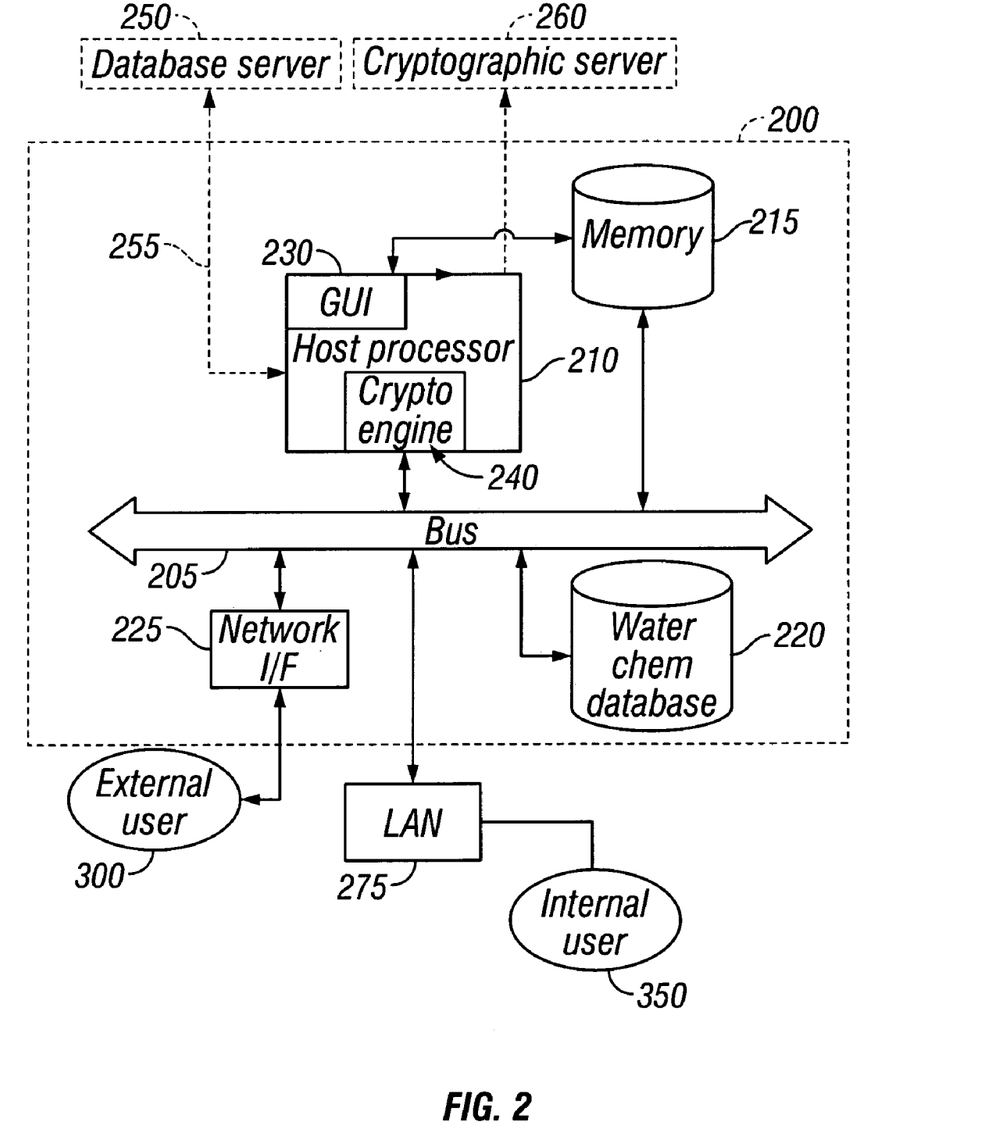
FIG. 2 illustrates an application server associated with the system of FIG. 1.

FIG. 2 illustrates an application server associated with the system of FIG. 1. Referring to FIG. 2, application server 200 utilizes a bus 205 to connect various components and to provide a pathway for data received from the users. Bus 205 may be implemented with conventional bus architectures such a peripheral component interconnect (PCI) bus that standard in many computer architectures. Alternative bus architectures such as VMEBUS, NUBUS, address data bus, RAM bus, DDR (double data rate) bus, etc., could of course be utilized to implement bus 205. External users 300 communicate information to application server 200 over a suitable connection that is received by bus 205, via a network interface 225. Internal users communicate over a suitable connection within a local area network (LAN 275) to communicate with application server 200.

Application server 200 also includes host processor 210, which may be constructed with conventional microprocessors such as currently available Pentium processors. Host processor 210 represents a central nexus at which all real-time and non-real time functions in application server 200 are performed, such as graphical-user interface (GUI) and browser functions, security functions, crack growth calculations, and the creation of suitable crack estimation behavior data for display and review by the user. Accordingly, host processor 210 includes a graphical user interface 230 which may be embodied in software as a browser. Browsers are software which present an interface to, and interact with, users of the system 1000. The browser is responsible for formatting and displaying user-interface components (e.g., hypertext, windows, etc.) and pictures. Typically, the user display interface is a GUI 230, as noted above.

Browsers are typically controlled and commanded by the standard hypertext mark-up language (HTML). Additionally, or in the alternative, any decisions in control flow of the GUI 230 that requires more detailed user interaction may be implemented using JavaScript. Both of these languages may be customized or adapted for the specific details of a given application server 200 implementation, and images may be displayed in the browser using well known JPG, GIF, TIFF and other standardized compression schemes. Other non-standardized languages in compression schemes may be used for the GUI 230, such as XML, "home-brew" languages or other known non-standardized languages and schemes.

Host processor 210 also includes a cryptographic processing unit 240. Cryptographic processing unit 240 serves to secure all personal information of registered users. Accordingly, application server 200 implements all security functions using cryptographic processing unit 240, so as to establish a firewall to protect the system 1000 from outside security breaches. Alternatively, and as shown in the dotted lines of FIG. 2, host processor 210 may be operatively connected to and interact with an external cryptographic server 260. Cryptographic server 260 performs all the aforementioned functions in order to protect system 1000 from outside security breaches, as well as to secure all personal information of registered users.

Host processor 210 may also have a memory 215 operatively connected thereto. Memory 215 may be embodied as RAM or SDRAM, and any other known non-volatile memory may be sufficient as memory 215. Memory 215 stores parameters input by the user for access by the host processor 210, in order to perform the crack estimation calculations.

A nuclear water chemistry database 220 may be operatively connected to the host processor 210 via bus 205. Nuclear water chemistry database 220 is actually a specific example of a mass storage device. In other words, database 220 may be replaced with other mass storage devices as is generally known in the art, such as a magnetic and/or optical storage devices (i.e., embodied as RAM, a recordable CD, a flash card, memory stick, etc.). Alternatively, application server 200 may be operatively connected to and interact with an external nuclear water chemistry database server 250, as shown in the dotted line of FIG. 2. For example, application server 200 may access database server 250 via a suitable link 255, which links the application server 200 to database server 250 in order to gather water chemistry data used by the crack behavior models for estimating component crack behavior, according to parameters input by user.

Figure 3:
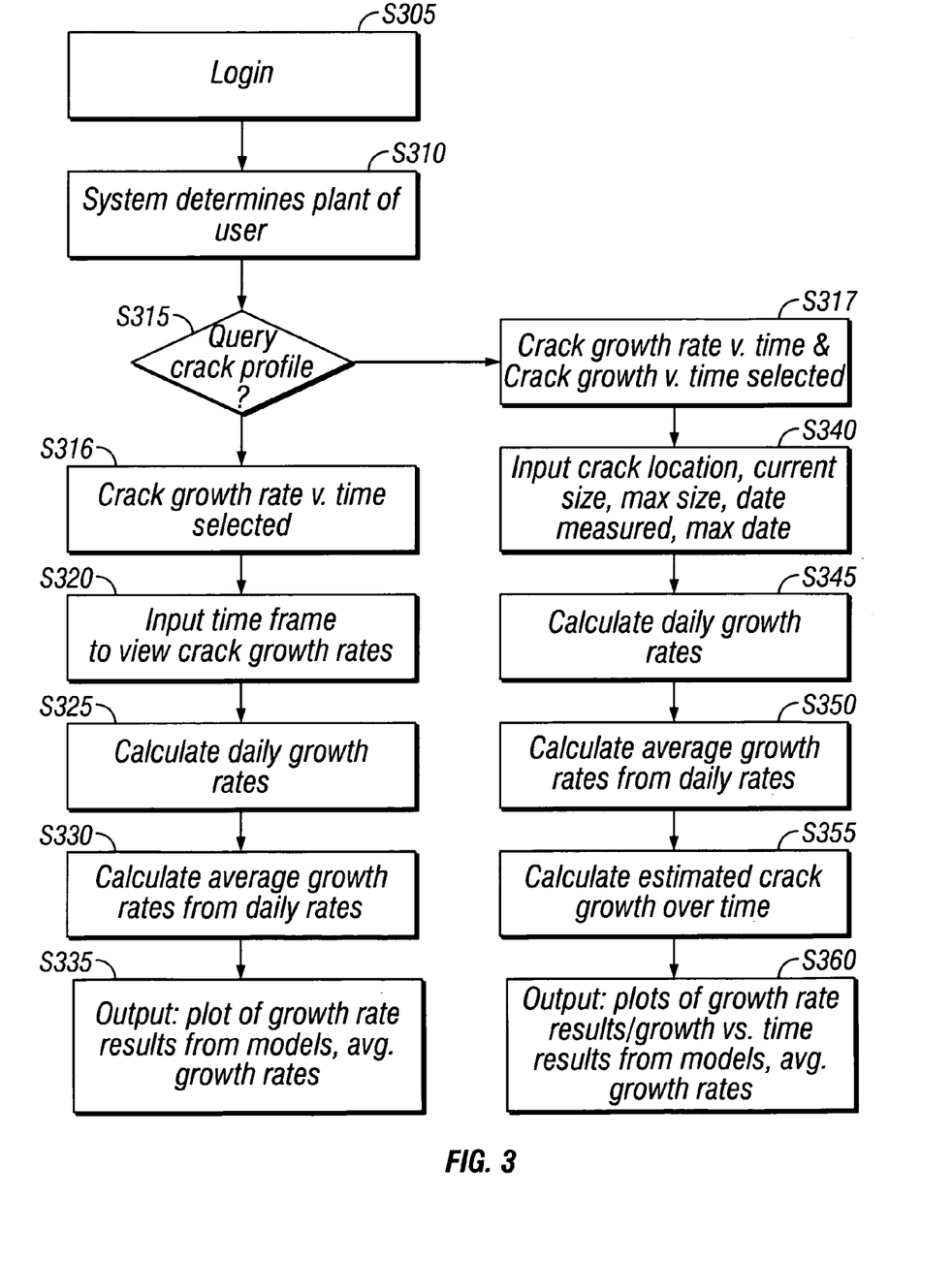
FIG. 3 is a flowchart illustrating the method in accordance with the present invention.

FIG. 3 is a flowchart illustrating the method in accordance with the present invention. Referring to FIG. 3, a user logs into (Step S305) the crack estimation calculation system 1000, preferably by entering a suitable identification (ID) and password, as is known. Based on the ID and password, system 1000 determines (Step S310) which nuclear power plant the user belongs to by comparing the entries to a user database to determine the user and reactor plant. This database may be embodied as a look-up table (LUT) that is part of memory 215. System 1000, via host processor 210 and GUI 230, queries the user to select which crack estimation profile to display (Step S315). The user may select from a display of crack growth rate versus time (Step S316) or a display of crack growth versus time and crack growth rate versus time (Step S317) by selecting a suitable icon, hypertext link, and/or cell of a pull-down menu, as is known.

In order to receive calculations and data related to crack growth rate versus time (Step S316), the user selects the desired icon, hypertext link and/or pull down menu selection and inputs a time frame (Step S320) in which to view crack growth rates. Based on the user's reactor plant and the time frame, system 1000 calculates (Step S325) daily crack growth rates using a plurality of crack behavior estimation models, and data in the nuclear water chemistry data base 250, as well as the time frame input by the user. System 1000 also calculates (Step S330) average crack growth rate based on a calculated daily crack growth rates for each crack behavior estimation model. From these calculations, system 1000 outputs (Step S335) a plot of crack growth rate versus time for each crack behavior model. Preferably, all curves are plotted on a single chart for comparison by the user. Additionally at Step S335, system 1000 displays average crack growth rates for each model over the time frame entered by the user.

Responsive to the query at step S315, should a user select a display of crack growth versus time and crack growth rate versus time at step S317, the user inputs initial crack size, maximum or allowable crack size (e.g. depth), date crack was measured and/or maximum date for the analysis (Step S340). Based on these inputs, system 1000 calculates (Step S345) daily crack growth rates from all the crack behavior models, data in the accessible nuclear data chemistry database 220 and the date the crack was measured. System 1000 calculates (Step S350) an average crack growth rate based on the daily crack growth rates for each crack behavior model. The system 1000 also calculates (Step S355) estimated crack growth over time, based on the calculated daily crack growth rates and the calculated average crack growth rate.

Accordingly, system 1000 outputs (Step S360) a plot of crack growth rate versus time for each model. Preferably, all curves are plotted on the same chart. System 1000 also outputs a plot of crack growth versus time for each model; with all curves preferably plotted on the same chart. The plots utilize historical data to calculate crack growth up until a point where the historical data ends. At this point, average crack growth rate is utilized to calculate future or new crack growth. This is performed for each crack behavior model. Additionally, horizontal lines representing current crack depth and maximum crack depth are plotted for review by the user; and vertical drop down lines are plotted which represent the time in which the estimated crack size (e.g. depth) reaches the maximum crack size allowed. Further, average crack rates are displayed for each model over the time frame plotted. Therefore, a user may quickly review these crack behavior estimations in an easy manner to determine if a fuller analysis is required. Moreover, the user may input parameters to access these plots at any time, since the website is available 24 hours a day.

Figure 4:
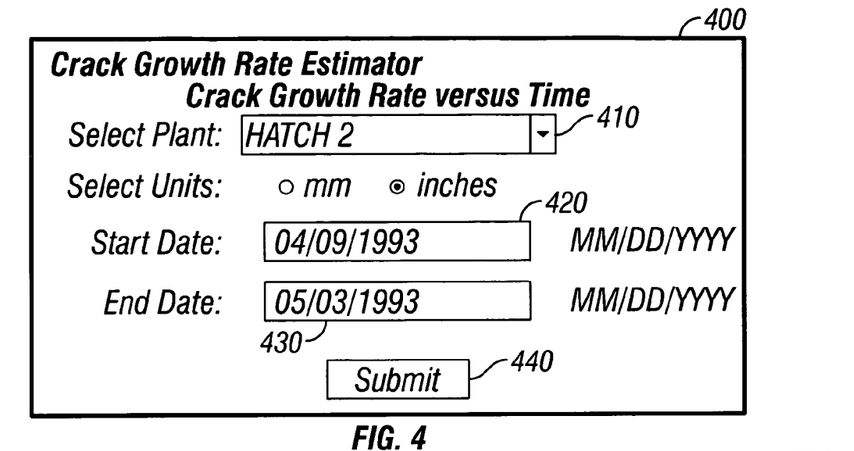
FIG. 4 is a sample input screen.

Referring to FIG. 4, after a user logs into the website, an input screen 400 is displayed. On input screen 400, there is a select plant cell 410, which may be embodied as a drop down menu of selectable reactor plants. Preferably, the reactor plant associated with the user's ID and password should be displayed; however the user may select the desired reactor plant from a drop down menu of select plant cell 410. Additionally, the user may select desired units for the plots at 415 and should input the starting and ending dates in a start date cell 420 and an end date cell 430. To initiate crack growth rate estimation, user selects a suitable execute button 440. The user may use any suitable input device, including a mouse, a keyboard, voice application software and/or pointing device in order to manipulate data on input screen 400.

Figure 5:
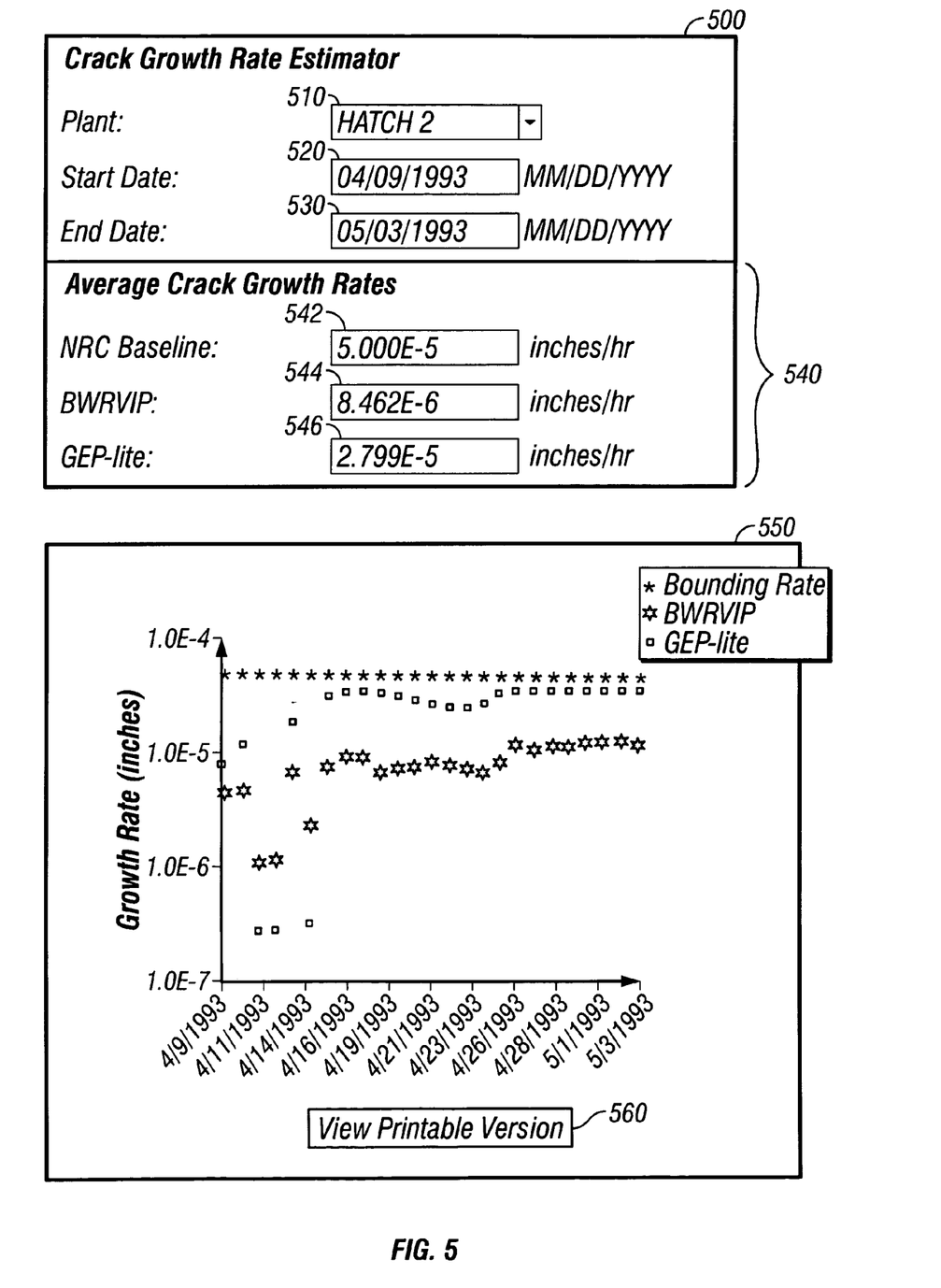
FIG. 5 is a sample screen illustrating a graphical representation used to display estimated crack growth rate and average crack growth rates in accordance with the invention.

Referring to FIG. 5, based on the data input by the user, the crack behavior estimations are calculated and displayed via GUI 230 for the user. Specifically, an output screen 500 includes the aforementioned select plant cell 510, start date cell 520 and end date cell 530. Additionally, there is an average crack growth rate cell 540 which includes the average crack growth rates calculated from the plurality of crack behavior estimation models run and/or accessed by application server 200. These models include a BWRVIP model, a GEP-lite model, and a GEP-lite with HWC model and display of a standard NRC-accepted crack growth rate (in inches/hour) or crack growth (in) time. As shown in FIG. 5, the accepted crack growth rate is $5e^{-5}$ inches/hr, although the standard may also be displayed in metric units.

In general, application server 200 receives inputs from user, accesses water chemistry data from database 250, and runs each of the crack growth behavior models based on the inputs and the retrieved water chemistry data. The results are calculated crack growth rate/crack growth data that is directed for display over a suitable GUI to the user.

For example, application server runs a BWRVIP model using the input parameters. This model was developed as part of a proprietary report that is utilized by members of the BWRVIP organization. The algorithm developed to determine crack growth rate and crack growth values is described in "BWR Vessel and Internals Project, Evaluation of Crack Growth in BWR Stainless Steel RPV Internals (BWRVIP-14)," EPRI Report TR-105873, March 1996.

The GEP-lite model is based on historical water chemistry data that has been collected over a number of years back. This chemistry data was analyzed to develop a mathematical correlation between a number a variables. This correlation, or algorithm, uses the variables in order to determine an estimated crack growth behavior profile, similar to the profile described in commonly-assigned U.S. application Ser. No. 2001-0053965 to Horn et al, the contents of which are incorporated by reference herein.

However, to perform calculations for crack growth rate and crack growth in accordance with the present invention, a number of the variables required by the algorithm described in Horn et al. have been assumed to be constant. Thus, the GEP-lite model algorithm is a simplified model that calls for fewer inputs, requiring only the data that is available to the algorithm or application run by application server 200. The resulting algorithm of the GEP-lite model predicts crack growth values using inputs of conductivity and electrochemical potential (ECP). The GEP-lite with HWC model is run by application server 200, when a plant being evaluated has hydrogen water chemistry. Hydrogen has a effect of lowering ECP dramatically in the plant; thus the algorithm for GEP-lite with HWC model sets ECP as a constant and receives a conductivity value input in order to determine crack growth rate and crack growth values. In other words, the same, simplified algorithm of the GEP-lite model is used in the GEP-lite with HWC model, with the exception of setting ECP as a constant value.

As shown in FIG. 5, average crack growth rates for the NRC Accepted rate (NRC Baseline), BWRVIP model and GEP-lite model are displayed in cells 542, 544 and 546. Additionally, a plot of crack growth rate versus time is displayed in cell 550. Referring to the key in cell 550, there is illustrated results from the plurality of crack estimation models (where Bounding Rate represents NRC Baseline value). Cell 550 enables the user to determine trends in crack growth rate based on the user's input parameters. In other words, if two or more models illustrate that the crack growth rate is increasing (substantially), the user may be inclined to commence a detailed crack analysis. Optionally, the user may view a printable version by selecting cell 560, a print icon, or a print function from a file drop down menu on the webpage displaying output screen 500, as is known.

Figure 6:
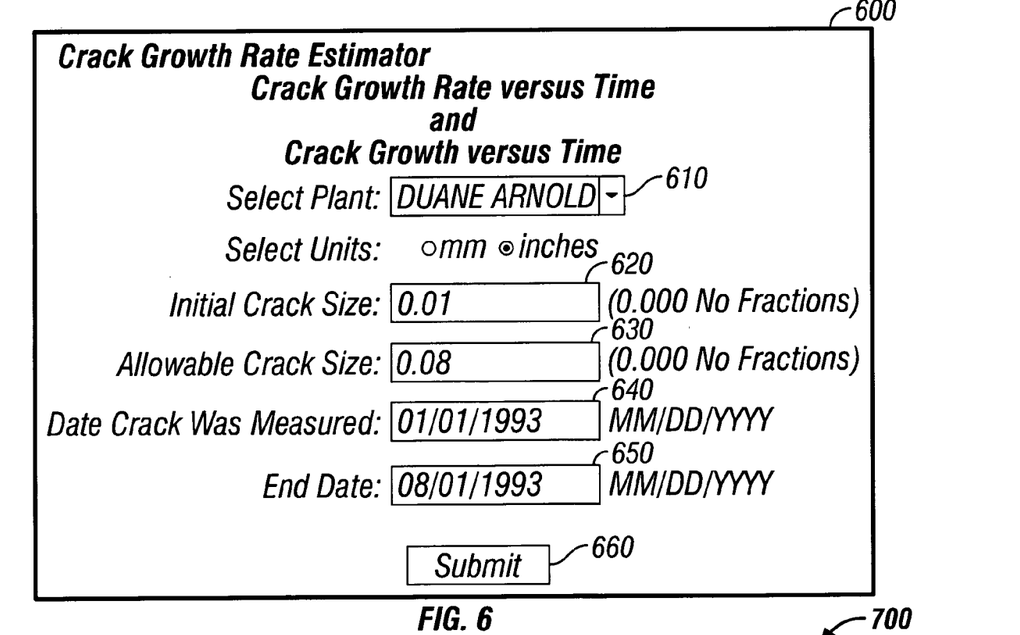
FIG. 6 is a sample input screen in accordance with another exemplary embodiment.

As shown in FIG. 6, input screen 600 inputs include a select plant cell 610, initial crack size cell 620, allowable crack size cell 630, date crack was measured cell 640 and an end date cell 650. To initiate the calculation of crack growth rate versus time and crack growth versus time, the user selects a suitable execute button 660.

Figure 7:
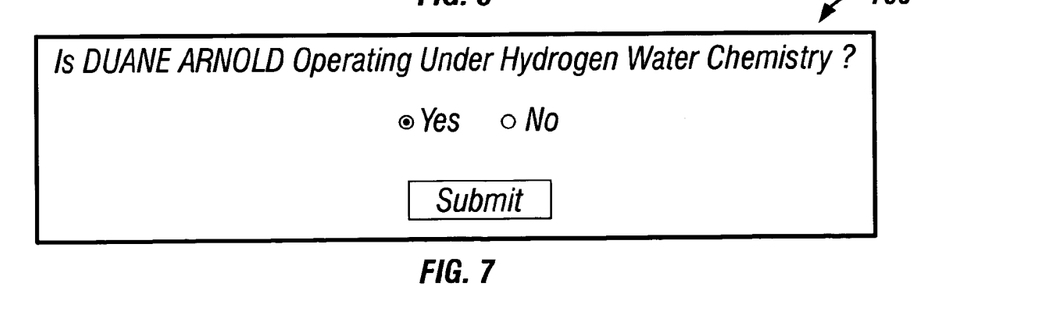
FIG. 7 a query screen.

Referring to FIG. 7, once the parameters of FIG. 6 have been entered, the user may be queried with a cell 700 as to whether or not the user's 300/350 reactor plant is operating under hydrogen water chemistry. In FIG. 7, should the user select YES, then results calculated by the GEP-lite w/HWC model are displayed. This model is necessary because plants that utilize hydrogen water chemistry often realize greater change in the crack growth rate then in non-HWC nuclear power plants.

Figure 8:
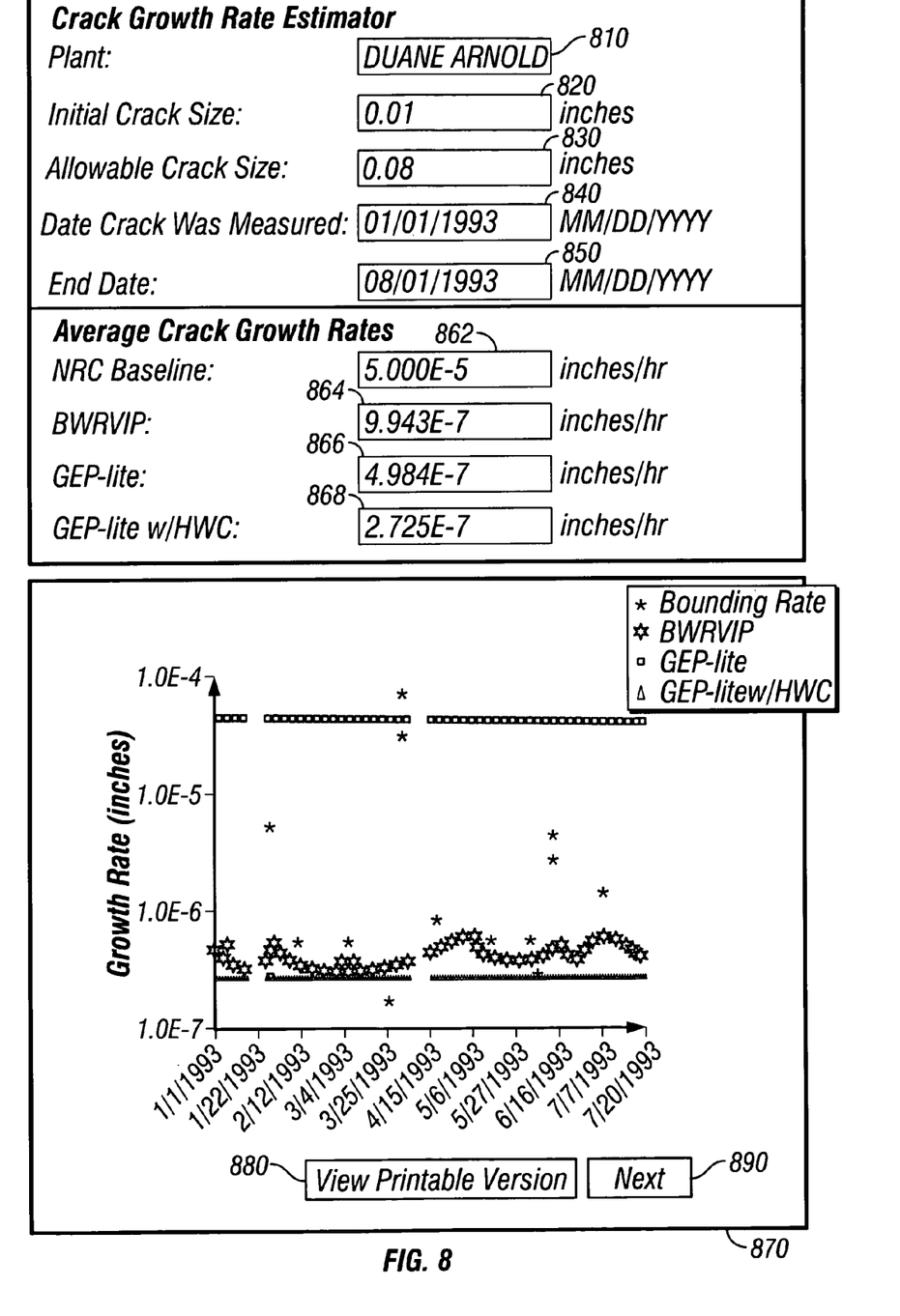
FIG. 8 is a sample screen illustrating a graphical representation of estimated crack growth rate in average crack growth rate in accordance with the invention.

Referring now to FIG. 8, an output screen 800 includes the aforementioned plant type cell 810, initial crack size cell 820, allowable crack size cell 830, date crack was measured cell 840, and end date cell 850. Screen 800 also displays the calculated average crack growth rates, which were determined by the application server 200 utilizing a plurality of crack behavior models, and by accessing water chemistry data accessed from database 220. Specifically, values are calculated for an NRC baseline model cell 862, a BWRVIP model cell 864, a GEP-lite model cell 866, and a GEP-lite with HWC model cell 868. Additionally, a plot of crack growth rate versus time is displayed in cell 870 for each of the crack behavior estimation models, preferably to be used for comparison by the user.

Figure 9:
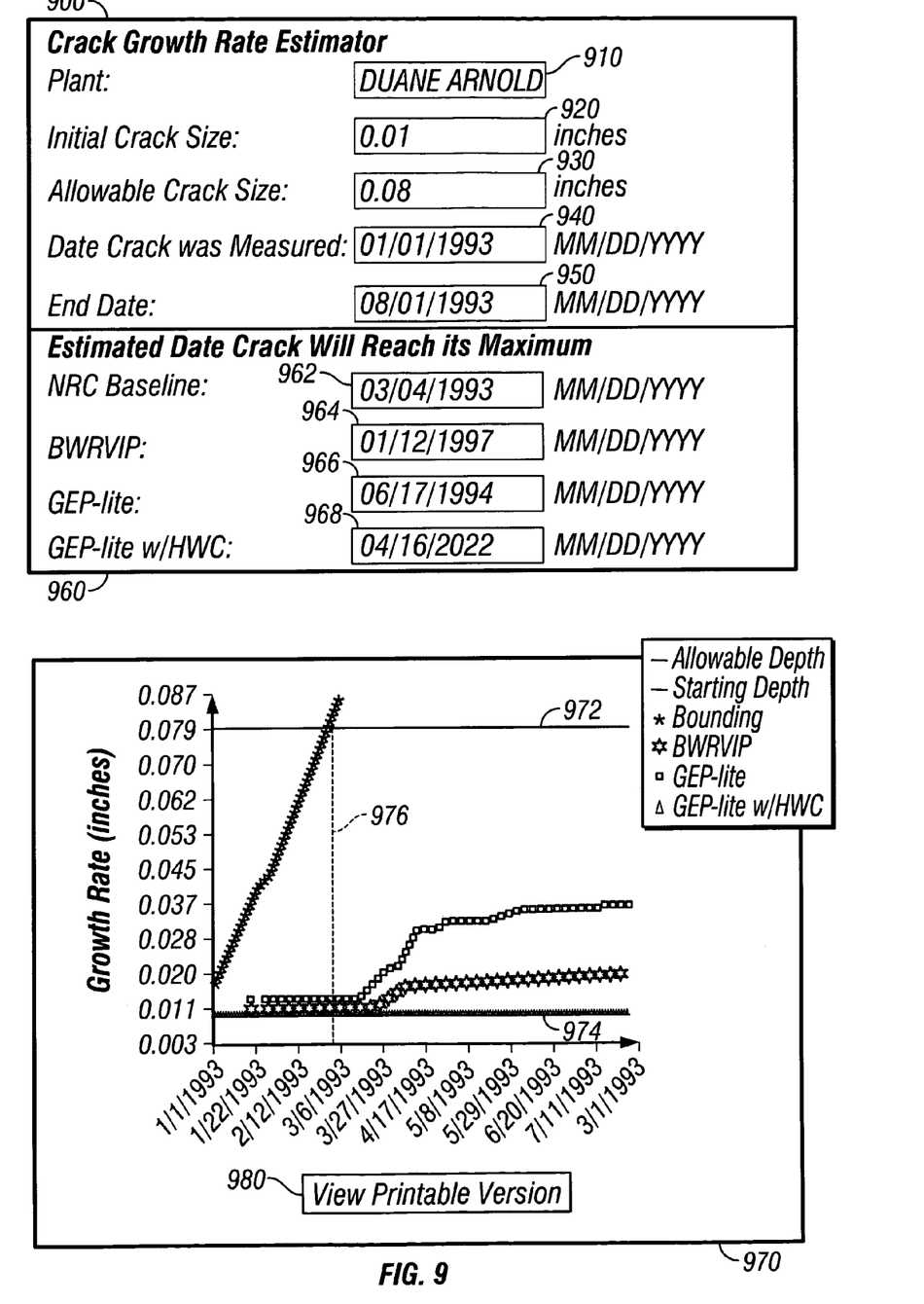
FIG. 9 is a sample screen illustrating a graphical representation of estimated crack growth rate, estimated date at which crack reaches a maximum and crack growth in accordance with the invention.

Referring to now FIG. 9, and in addition to the display of crack growth rate versus time, the user receives a display of crack growth versus time. An output screen 900 includes the aforementioned cells 910 through 950, which summarize the inputs of the user. Additionally, screen 900 includes the estimated date crack reaches its maximum 960, which is calculated in each of the crack behavior models. As shown in FIG. 9, estimated dates are calculated for display at the NRC baseline in cell 962, the BWRVIP model cell 964, the GEP-lite model cell 966 and the GEP-lite with HWC model cell 968. Additionally, a plot of crack growth versus time is provided in cell 970 for comparison by the user. The plot in cell 970 shows a depth of the crack in inches over a desired date range for each of the crack behavior models (and for the NRC Baseline, represented as "Bounding" in cell 970), it being understood that metric units could be represented on the plot in cell 970. Additionally, a horizontal line 972 illustrates the allowable depth, a line 974 illustrates a starting depth, and a vertical line 976 illustrates the time in which the estimated crack size will reach the maximum crack size in FIG. 9 shown at approximately Mar. 6, 1993.

The invention being thus described, it will be obvious that the same may be varied in many ways. For example, the functional blocks in FIGS. 1 and 2 may be implemented in hardware and/or software. The hardware/software implementations may include a combination of processor(s), application service provider(s), application specific integrated circuits (ASICs) and/or article(s) of manufacture. The article(s) of manufacture may further include storage media and executable computer program(s). The executable computer program(s) may include the instructions to perform the described operations. The computer executable program(s) may also be provided as part of externally supplied propagated signal(s). Such variations are not to be regarded as departure from the spirit and scope of the invention, and all such modifications as would be obvious to one skilled in the art are intended to be included within the scope of the following claims.

What is claimed is:

1. A method of performing crack behavior estimations for a nuclear reactor, comprising:
   receiving parameters input by a user, wherein the parameters include a reactor identification, a current crack size, a date at which crack was measured, a maximum crack size and a date range to view; and
   calculating crack behavior estimations based on the received parameters using a plurality of accessible crack behavior models.

2. The method of claim 1, further comprising;
   determining the nuclear reactor of the user based on the received parameters.

3. The method of claim 1, wherein the step of calculating further comprises:
   (a) calculating crack growth rate over time; or
   (b) calculating crack growth rate and crack growth over time,
   wherein step (a) or step (b) is performed based on user selection.

4. The method of claim 3, wherein the step of displaying further comprises:

displaying a plot of crack growth rate versus time for each model; and displaying average crack growth rates for each model, when the user selects step (a).

5. The method of claim 4, wherein the plot of crack growth rate versus time for each model is displayed on a single display screen for the user.

6. The method of claim 3, wherein the step of displaying further comprises:

displaying a plot of crack growth rate versus time for each model; and displaying a plot of crack growth versus time for each model;

if the user selects step (b).

7. The method of claim 6, wherein the plot of crack growth rate versus time for each model is displayed on a single display screen for the user; and the plot of crack growth versus time for each model is displayed on another single display screen for the user.

8. The method of claim 1, wherein the step of calculating further comprises:

calculating a daily crack growth rate based on each of the plurality of models, a time frame input by the user, and data from an accessible nuclear water chemistry database.

9. The method of claim 8, wherein the step of calculating further comprises:

calculating an average crack growth rate based on the calculated daily crack growth rates.

10. The method of claim 1, wherein the step of calculating further comprises:

calculating a daily crack growth rate based on each of the plurality of models, the date at which crack was measured on data from an accessible nuclear water chemistry database.

11. The method of claim 10, wherein the step of calculating further comprises:

calculating an average crack growth rate based on the calculated daily crack growth rates.

12. The method of claim 11, wherein the step of calculating further comprises:

calculating an estimated crack growth over time based on the calculated daily crack growth rates and based on the calculated average crack growth rate.

13. A method by which a client obtains crack behavior estimations for a nuclear reactor over a client-server network, comprising:

inputting by the client, reactor plant parameters to a server, wherein the parameters include a reactor identification, a current crack size, a date at which crack was measured, a maximum crack size and a date range to view; and receiving, at the client from the server, crack behavior estimations in response to the input parameters, in which the estimations are determined by using a plurality of crack behavior models accessible by the server.

14. The method of claim 13, the client further selecting desired crack behavior estimations to be displayed.

15. The method of claim 14, wherein the step of receiving further comprises:

the client receiving a plot of crack growth rate versus time for each model from the server; and the client receiving average crack growth rates for each model from the server.

16. The method of claim 14, wherein the step of receiving further comprises:

the client receiving a plot of crack growth rate versus time for each model from the server; and the client receiving a plot of crack growth versus time for each model from the server.

17. The method of claim 14, wherein the step of receiving further comprises the client receiving an estimated date at which crack will reach its maximum size from the server, the estimated date being calculated by each of the plurality of models accessible by the server.

18. An application server in a world wide web-based network for determining crack behavior estimations for a nuclear reactor of a requesting client, comprising:

means for receiving reactor parameters input by the client;

means for calculating crack behavior estimations based on the received reactor parameters by using a plurality of crack behavior models accessible from a nuclear water chemistry database operatively connected to the application server, wherein the crack behavior estimations include at least an average crack growth rate for all models; and means for displaying the calculated crack behavior estimations to the requesting client.

19. The application server of claim 18, wherein the means for displaying include a graphical user interface.

20. The application server of claim 18, wherein the means for receiving include a system bus for receiving data input by the requesting client over an internet browser.

21. The application server of claim 18, wherein the crack behavior estimations further include estimated crack growth rate for the client's nuclear reactor that are calculated by each model.

22. The application server of claim 18, wherein the crack behavior estimations further include estimated crack growth for the client's nuclear reactor that are calculated by each model.

23. The application server of claim 18, wherein the crack behavior estimations further include an estimated date a crack in the client's nuclear reactor reaches a maximum based on each model.

24. A computer program product comprising a computer-readable medium having computer program logic stored thereon for enabling a processor of the product to determine crack behavior estimations for a nuclear reactor, the computer program logic causing the processor to perform the steps of:

accepting reactor plant parameters at a central nexus; and outputting crack behavior estimations by processing the accepted plant parameters using a plurality of accessible crack behavior models, wherein said outputting includes outputting a plot of crack growth rate versus time for each model and outputting average crack growth rates for each model.

25. The computer program product of claim 24, wherein the nexus is electronically accessible by at least one requesting user.

26. The computer program product of claim 24, wherein the computer program logic enables the processor to:

output a plot of crack growth rate versus time for each model over a graphical user interface; and output a plot of crack growth versus time for each model over the graphical user interface.

* * * * *